May 30, 1961 O. R. PETTERS 2,986,331
PHASE METER SETTING MECHANISM
Filed Aug. 1, 1957 4 Sheets-Sheet 1
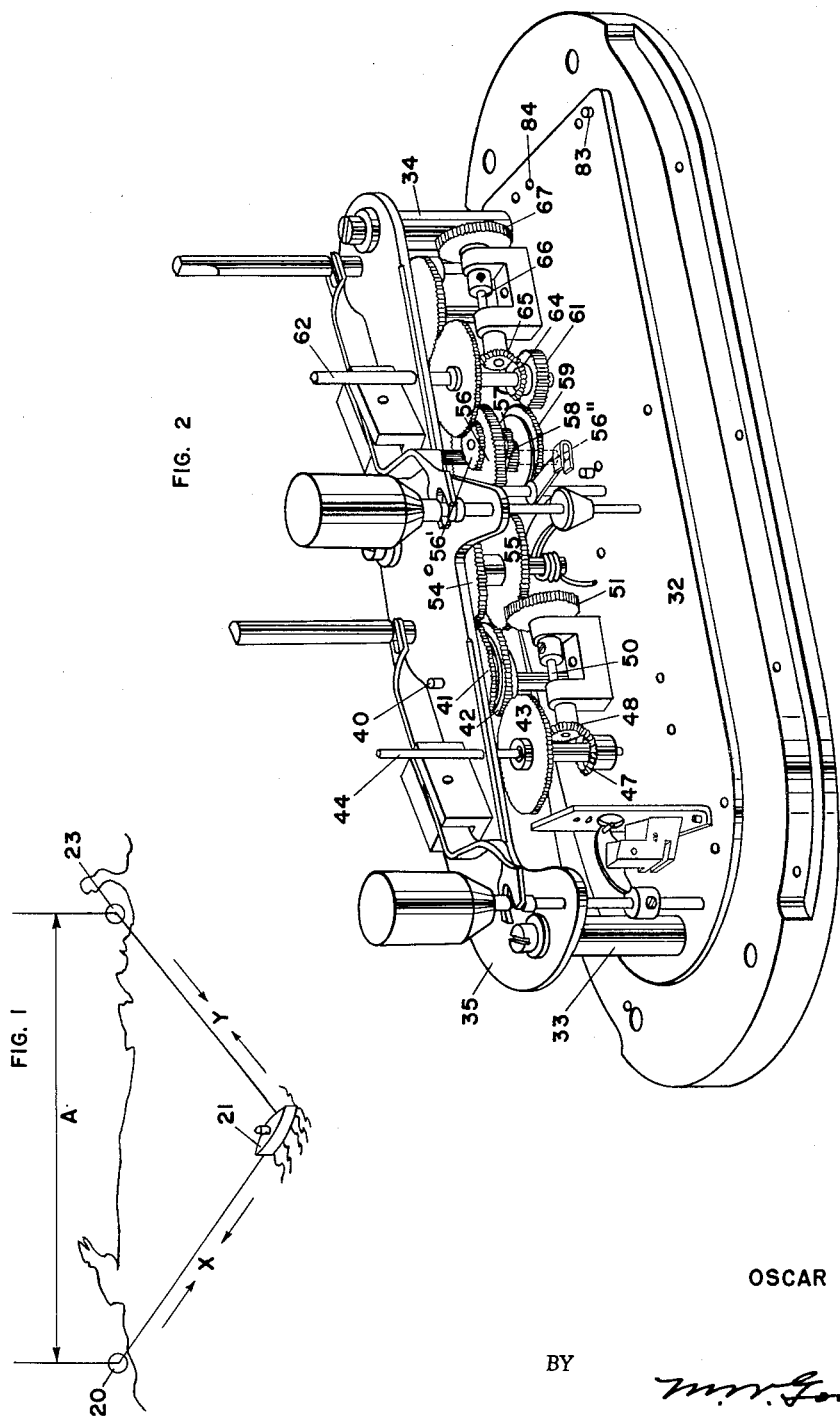
INVENTOR
OSCAR R. PETTERS
BY *M. W. Gould*
ATTORNEY May 30, 1961  O. R. PETTERS  2,986,331
PHASE METER SETTING MECHANISM
Filed Aug. 1, 1957  4 Sheets-Sheet 2

INVENTOR
OSCAR R. PETTERS

BY  *M. V. Gould*
ATTORNEY

May 30, 1961  O. R. PETTERS  2,986,331
PHASE METER SETTING MECHANISM
Filed Aug. 1, 1957  4 Sheets-Sheet 3

INVENTOR
OSCAR R. PETTERS

BY  *M. V. Gould*
ATTORNEY

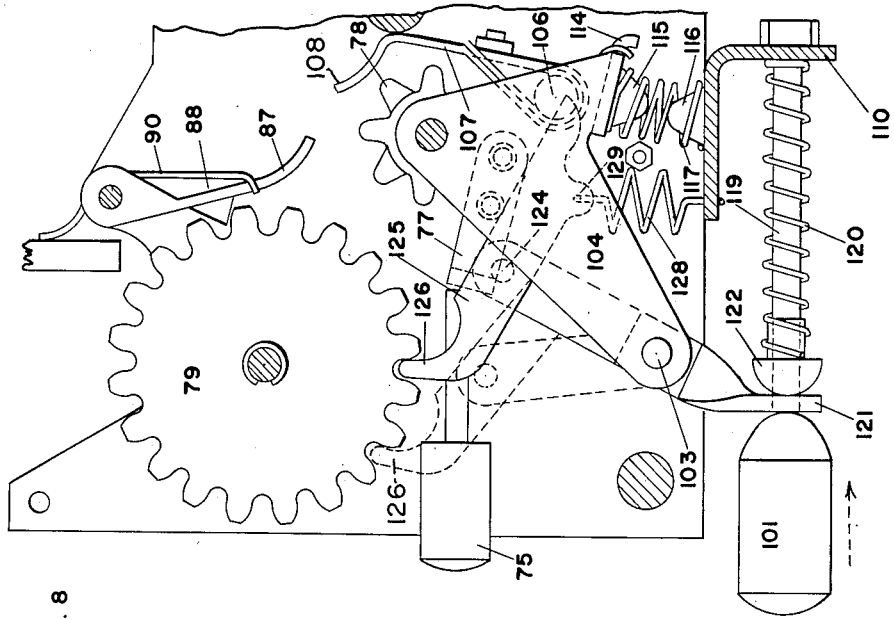
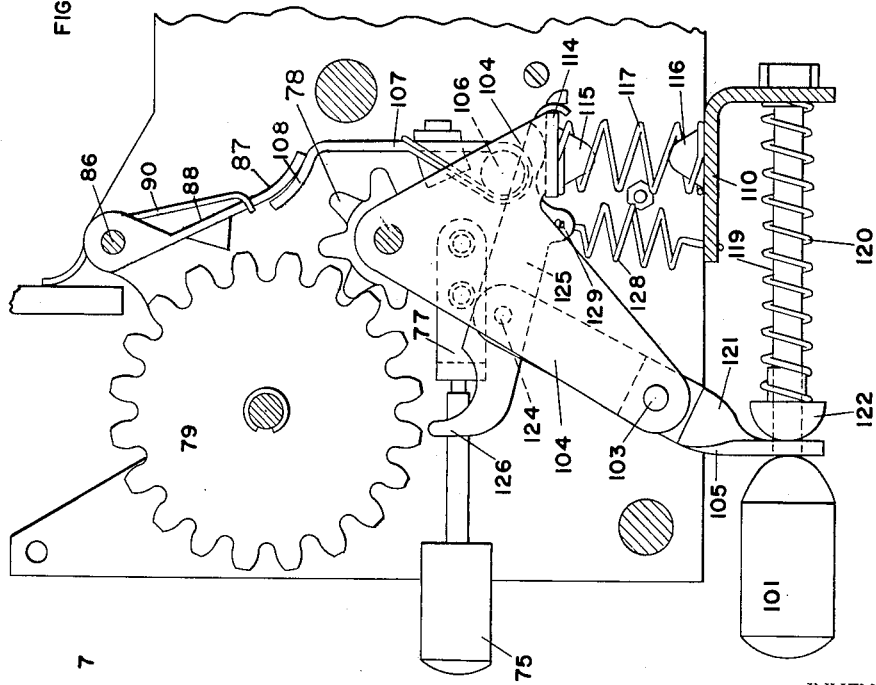

United States Patent Office 2,986,331
Patented May 30, 1961

2,986,331
PHASE METER SETTING MECHANISM
Oscar R. Petters, Columbia, Pa., assignor to Hamilton Watch Company, Lancaster, Pa., a corporation of Pennsylvania
Filed Aug. 1, 1957, Ser. No. 675,737
4 Claims. (Cl. 235—132)

This invention relates to an attachment or improvement for a phase meter, and particularly to the means for setting a particular series of dials within the phase meter.

Ships' positions at sea may be continually plotted through a phase meter in which a radio signal is received from a station and a relay station, the distance between the station and the relay station being known the ship's position may be at all times determined by the difference in time in the reception of the signal from the radio station and from the relay station. An instrument called a phase meter is used to determine and record these distances so that the immediate distance from the ship to either the radio station or the relay station is at all times available. To make the reading of the phase meter easier the dials are generally advanced to a reading which, when the ship has reached the desired point, will read on the phase meter zero. It is then necessary to preset the dials to a determined number so that the recording of the distance on the phase meter will run the dials from the preset reading to a reading of zero. This invention relates to the mechanism for presetting the dials to any number.

It is the object of the present invention to provide means for setting the dials used in connection with the phase meter for indicating these distances.

It is a still further object of the present invention to provide means whereby a plurality of dials may be set to any desired number.

It is a still further object of the present invention to provide means for setting the individual drums of the plurality of dials so that the mechanism may be set to a predetermined number and the mechanism run from that number backwards to zero.

It is a further object of the present invention to provide sets of accumulative dials reading in thousands, hundreds, tens and units which may be quickly and easily set to any desired number through push button control.

It is a further object of the present invention to provide sets of dials which may be preset in accordance with a predetermined figure so that a ship may be steered to an unknown position determined by the dial readings of zero, said dials being operated by radio reception from two different known points.

The invention is illustrated in the accompanying drawings in which:

Figure 1 is a schematic view showing the application of the phase meter.

Figure 2 is a perspective view of the mechanism of the phase meter particularly showing the differential means for driving the second dial.

Figure 7 is an enlarged view of the same mechanism shown in Figure 6.

Figure 8 is a view similar to Figures 6 and 7 with the elements in a different position.

Figure 3:
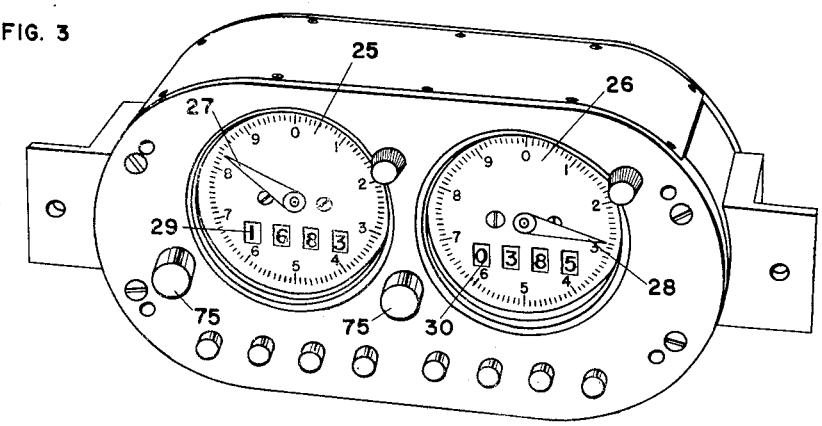
Figure 3 is a front perspective view of the phase meter.
Figure 6:
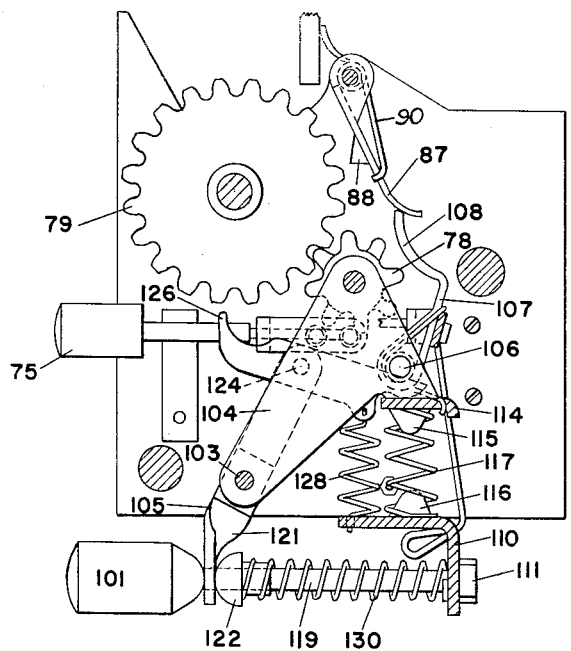
Figure 6 is a side elevation of the setting mechanism.

Referring particularly to Figure 1, a permanently based transmitting station 20 from which radio signals may be sent at intervals is located X distance from a ship 21. Also located an unknown distance Y from the ship 21 is a relay station 23. This relay station may be at a permanent base or at a movable base, the distance A, however, from the transmitter to the relay station is a known distance. An electronic device carried by the ship picks up the radio signal sent from the transmitter station 20. The signal is sent at known time intervals and through a computer the distance from the transmitting station is expressed in revolutions per unit of time by the motor. These revolutions are transferred to the left hand dial 25 (Figure 3). In a like manner the signal received from the relay station, which may be the return of a signal sent from the ship or a relay of the signal sent from the transmitter station, is expressed in the distance X minus Y and transformed into revolutions per unit of time. The distance Y is shown on the right hand dial 26 (Figure 3). The distance Y is arrived at through the use of a differential in the mechanism which is illustrated in Figure 2.

The use of a phase meter is old and well known and by accumulating the revolutions of either of the hands 27 of the dial 25 and 28 of the dial 26 on a plurality of drums shown at 29 and 30, a ship or plane may be sent to an unknown location by simply supplying a pair of numbers representing the distances X and Y. It is sometimes desirable to run the motors in a reverse direction so that the accumulated reading on the drums 29 and 30 are preset to the distances which are given as the distances X and Y. With the motors running in a reverse direction the ship is steered until the dials both read zero, at which time the ship may be at the appointed spot. In order to set the dials to any desired number, it was necessary to have some means of rotating the dials to reach this number. With the dials connected in the ordinary manner a considerable time was spent in the setting of the dials. It was highly desirable then that some method or means be devised by which each drum could be set to any desired figure with the drums in a disconnected position, and after setting the dials and unit as a whole reconnected to the motor driving the hands 27 and 28. The mechanism for setting these hands is the nature of the present invention.

Refering particularly to Figures 2 and 3, a base plate 32 has mounted thereon a pair of posts 33 and 34 supporting an upper bridge 35 between which a series of gears are mounted converting the drive of the electronic motors (not shown) to the hands, and includes the differential mechanism by means of which the revolutions of the motor expressing the distance X minus Y are transformed to the distance Y.

A shaft 40 is connected to an electronic motor turned to represent the distance X. As this distance is constantly changing, the speed at which the motor drives the shaft 40 is constantly changing. This shaft has connected thereto a gear 41 which drives through connected gears a shaft 44 connected directly to the hand 27. Thus, the rotation of the electronic motor is seen, expressed in distance by the rotation of the hand 27. The accumulated rotations of this hand are expressed either positively or negatively on the reading 29 and the dial 25. The rotation of the shaft 44 through the gears 42 and 43 also turns the beveled gears 47 and 48. These rotate the shaft 50 which is connected through the gear 51 to gear 52 (on the detachable counter unit shown in Figure 4). The counter units have been omitted from Figure 2 in order that the gearing may be seen.

The gear 41 meshes with gear 54 which turns gear 55 in turn in mesh with gear 56. The gear 56 carries planetary gears 57. Gear 56 is freely mounted on shaft 56$^1$. Above the gear 56 the shaft 56$^1$ is provided with teeth 56$^{11}$ in mesh with planetary gear 57. A pinion 58 is connected to the electronic motor driven in revolutions per unit of time representing the distance X minus Y thru 56$^1$ (extending through back of case and not shown). Due to the rotation of the shaft and teeth 56$^{11}$ from the electronic motor the planetary gears 57 meshed with teeth 56$^{11}$ and pinion 58 on gear 59, and the gear 56 through being in mesh with the gear 55, the gear 59 rotates at a differential of these speeds and represents the distance Y. This is transferred by gear 61 to the shaft 62 which is connected to the hand 28 in the right hand dial 26 shown in Figure 3. The shaft 62 also turns beveled gears 64 and 65, shaft 66 and gear 67 which is in mesh with gear 52 of the counter unit.

Figure 4:
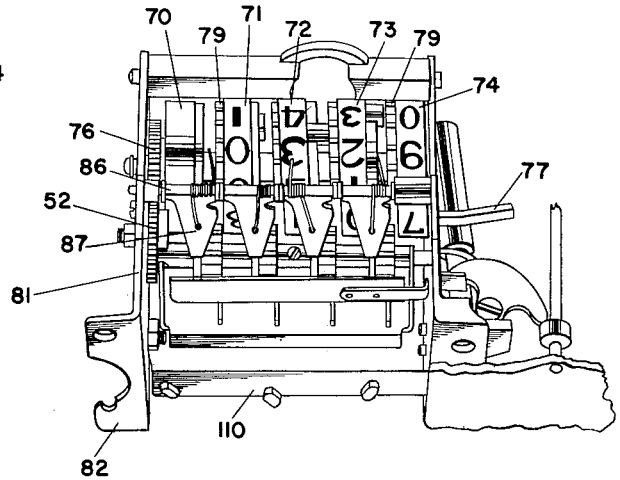
Figure 4 is a perspective view looking at the rear of the counting mechanism.
Figure 5:
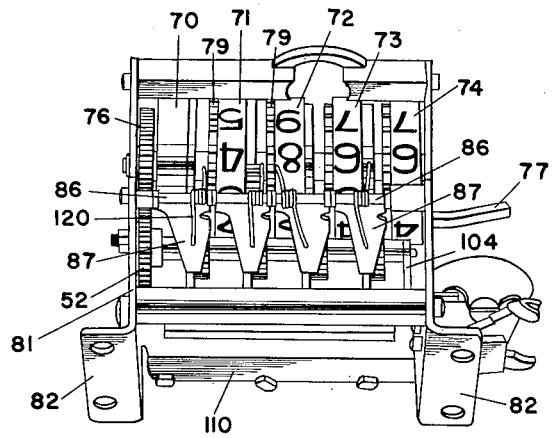
Figure 5 is a similar view with parts removed.

Referring particularly to Figures 4 and 5, a counter mechanism having a plurality of drums 70, 71, 72, 73 and 74 is driven through the gear 76 which is in mesh with the gear 52. Drum 70 is blank and turns in unison with hand 27, while drums 71, 72, 73 and 74 carry indicia and are progressisvely advanced through rotation of drum 70 and indexing gears 79. The drums are progressively indexed from left to right, as shown in Figure 4, which gives the correct reading when viewed from the front side as shown in Figure 3. These counter mechanisms are slightly different in that they can work either forward or backwards and can be completely released from the actuating gear by pressing the push button 75 which moves the lever 77 which moves the bank of driving gears 78 out of mesh with the gears 79 connected to each of the individual drums.

The counter mechanisms are housed in a frame 81 having feet 82 which are positioned by means of steady pins 83 and holes 84 so as to bring the gear 52 into mesh with either the gear 51 or the gear 67.

The shaft 86 carries a plurality of pawls 87 each of which has an inturned tab 88 which moves into engagement with the teeth of the wheel 79. Ordinarily, the tab 88 serving as a pawl is out of mesh with the gears 79 allowing them to turn freely during the counting. However, when it is desirable to set the counter mechanism, the lever 75 moves the bank of gears 78 out of engagement with the wheels 79 and brings the pawls 88 into engagement with the teeth of the gear 79 which permits the drums to be moved in one direction only.

Movement of the individual drums is accomplished by pressing the buttons 101 selected individually for the drum it is desirous of moving. A framework having end plates 104 pivotally supported on the rod 103 moves the connecting pinions 78 into and out of engagement with the wheel 79 upon operation of the knob 75 through the lever 77 riveted to the end plates 104. The end plates 104 are joined by a bottom plate 114 which is formed with a conical knob 115. A similar knob 116 is carried on the bracket 110 between which a coil spring 117 is positioned. This spring serves to normally rotate the framework about the rod 103 to hold the unit in working position.

A plate 107 having a plurality of integral spring fingers 108 is pivotally mounted on studs 106 carried by the end plates 104. The spring fingers 108 normally hold the pawls 87 so that the tab 88 is out of engagement with the teeth of the wheel 79, but upon movement of the push button 75 the fingers 108 are moved away from engagement with the pawl 87 and the tab 88 is moved into engagement with the teeth of the wheel 79 under the influence of the spring 90. At this time the wheels 79 and the companion drums 71, 72, 73 and 74 are free to be individually rotated by means of the push button 101.

The push buttons 101 are carried on rods 119 which are mounted in the brackets 110 attached to the framework and have springs 120 which normally hold them in a forward position. A lever 121 is carried on the push button rod between the push button 101 and the spring cap 122 causing the end of the lever 121 to be held between the push button 101 and the spring cap 122 and rides freely on the rod 110. The lever 121 is pivotally mounted on rod 103 and carries a pivot 124 at its far end. Mounted on the pivot 124 is a lever 125 formed with a tooth engaging finger 126 at one end which is adapted to be brought into engagement with the teeth of the gear 79. A spring 128 attached to the bracket 110 at one end and to an ear 129 of the lever 125 at the other end urges the finger 126 into tooth engagement with the gear 79 upon operation of the push button 101. The gear 79 is advanced a predetermined distance through the operation of the push button 101 in the direction indicated by the dashed arrow in Figure 7, and through the lever 121 and the lever 125, thus driving finger 126 into the dashed position shown, the gear 79 being held in the advanced position by the pawl 88. The rate of advancement of the gear 79 is such so as to advance the numerals of the dials 71, 72, 73 or 74 one complete step with each operation of the push button 101.

It is most advantageous to be able to operate the mechanism from a required predetermined number to zero on both dials 25 and 26 so that with the mechanism shown and explained, the dials may be easily set to any predetermined number by operation of the selected push buttons 101. The ship is then operated on a course so as to bring both of the dial readings to zero indicating that the desired position has been reached.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a phase meter having electronic motors operated from radio signals, a counter mechanism comprising a plurality of indicia bearing drums rotatable about a common axis, operating means for one drum, said drum designed to advance its adjacent drum one indication per revolution, a driven gear rotatable with each of said indicia bearing drums, a bank of gears normally meshing with said driven gears, means for simultaneously disengaging said bank of gears from said driven gears, and means for presetting each individual indicia bearing drum, said means for presetting each individual indicia bearing drum including a driving pawl member engageable with each of said driven gears but normally out of engagement therewith, and wherein said means for simultaneously disengaging said bank of gears from said driven gears also acts to bring each driving pawl member into engagement with its associated driven gear.

2. In a phase meter as set out in claim 1 including a pivotal frame member supporting said bank of gears, means for biasing said frame member toward said driven gears, and wherein said means for simultaneously disengaging said bank of gears from said driven gears includes a push button operable with a lever on said pivotal frame member to overcome said biasing means.

3. In a phase meter as set out in claim 1 including push button means associated with each driving pawl member to selectively move an individual pawl member into driving relation with one of said driven gears.

4. In a phase meter as set out in claim 3 including a second pawl member engageable with each of said driven gears cooperating with said driving pawl member to limit the rotation of said driven gear, said second pawl member being brought into operable position by said means for simultaneously disengaging said bank of gears from said driven gears.

References Cited in the file of this patent

UNITED STATES PATENTS

| | | |
|---|---|---|
| 688,977 | Skirrow | Dec. 17, 1901 |
| 2,137,013 | Bradley | Nov. 15, 1938 |
| 2,138,287 | Willers | Nov. 29, 1938 |
| 2,219,636 | Schwartz | Oct. 29, 1940 |
| 2,588,935 | Oran | Mar. 11, 1952 |